(12) United States Patent
Waller et al.

(10) Patent No.: US 9,221,617 B2
(45) Date of Patent: Dec. 29, 2015

(54) CONVEYOR CARRIAGE POSITION MONITORING

(71) Applicant: Joy MM Delaware, Inc., Wilmington (DE)

(72) Inventors: Rex Waller, Pittsburgh, PA (US); Patrick Waugh, East Millsboro, PA (US)

(73) Assignee: Joy MM Delaware, Inc., Wilmington, DE (US)

( * ) Notice: Subject to any disclaimer, the term of this patent is extended or adjusted under 35 U.S.C. 154(b) by 50 days.

(21) Appl. No.: 14/267,332

(22) Filed: May 1, 2014

(65) Prior Publication Data

US 2014/0330430 A1 Nov. 6, 2014

Related U.S. Application Data (60) Provisional application No. 61/818,327, filed on May 1, 2013.

(51) Int. Cl.
| | |
|---|---|
| *B65G 23/44* | (2006.01) |
| *B65G 43/00* | (2006.01) |
| *G01B 7/02* | (2006.01) |

(52) U.S. Cl.
CPC ............... *B65G 43/00* (2013.01); *B65G 23/44* (2013.01); *G01B 7/026* (2013.01)

(58) Field of Classification Search
CPC ......... B65G 23/44; G01B 7/023; G01B 7/026
USPC ........................................................ 700/230
See application file for complete search history.

(56) References Cited

U.S. PATENT DOCUMENTS

| | | | | | |
|---|---|---|---|---|---|
| 2,648,424 | A | * | 8/1953 | Bateman | 198/814 |
| 2,796,167 | A | * | 6/1957 | Thomson | 198/812 |
| 2,852,127 | A | * | 9/1958 | Barrett | 198/812 |
| 2,858,932 | A | * | 11/1958 | Risse | 198/810.04 |
| 2,951,580 | A | * | 9/1960 | Slomer | 198/812 |
| 3,015,473 | A | * | 1/1962 | Frellsen | 254/268 |
| 3,638,781 | A | * | 2/1972 | Comley | 198/810.04 |
| 3,675,482 | A | | 7/1972 | Hewitt | |
| 3,825,107 | A | * | 7/1974 | Cary et al. | 198/313 |
| 4,585,126 | A | | 4/1986 | Paddock et al. | |

(Continued)

OTHER PUBLICATIONS

International Search Report and Written Opinion for PCT Application No. PCT/US2014/036352 dated Sep. 4, 2014 (15 pages).

*Primary Examiner* — Gene Crawford
*Assistant Examiner* — Thomas Randazzo
(74) *Attorney, Agent, or Firm* — Michael Best & Friedrich LLP (57) ABSTRACT

A conveyor system including a conveyor belt; a conveyor rail including a track having a proximal end and a distal end, and a conveyor take-up for collecting excess conveyor belt; a conveyor carriage configured to move along the track between the proximal end and the distal end, the conveyor carriage including a base rotatably supporting the conveyor belt, and a target; a winch positioned proximate the proximal end of the track, the winch including a carriage cable coupling the conveyor carriage to the winch, a motor, and a motor sensor configured to sense a motor characteristic; a position sensor configured to sense a position of the target; and a controller having a memory and processor. The controller is configured to receive the motor characteristic and the position of the target, calculate a characteristic of the conveyor system, and output the characteristic.

20 Claims, 5 Drawing Sheets

(56) References Cited

U.S. PATENT DOCUMENTS

| | | | |
|---|---|---|---|
| 5,256,021 A * | 10/1993 | Wolf et al. | 414/393 |
| 5,398,911 A * | 3/1995 | Holster | 254/267 |
| 6,241,462 B1 * | 6/2001 | Wannasuphoprasit et al. | 414/800 |
| 6,508,353 B1 * | 1/2003 | Edstrom | 198/502.3 |
| 7,008,164 B2 * | 3/2006 | Rokkaku | 414/530 |
| 7,431,141 B2 | 10/2008 | Nadeau et al. | |
| 7,703,596 B1 | 4/2010 | Grollitsch | |
| 7,779,994 B1 | 8/2010 | Travis | |
| 7,963,349 B2 | 6/2011 | Prehn | |
| 2003/0184737 A1 | 10/2003 | Gehring | |
| 2004/0262132 A1 | 12/2004 | Pauley et al. | |
| 2008/0133051 A1 | 6/2008 | Wallace et al. | |
| 2009/0288933 A1 | 11/2009 | DeMong | |

* cited by examiner

CONVEYOR CARRIAGE POSITION MONITORING

RELATED APPLICATIONS

The present application claims priority to U.S. Provisional Application No. 61/818,327, filed May 1, 2013, the entire contents of which are hereby incorporated.

BACKGROUND

The present invention relates to position monitoring for conveyor belts used in the mining industry.

Position monitoring for conveyor belts is typically performed using incremental end coders that count turns of a motor shaft of the winch. The turns of the motor shaft provide an estimated position of a conveyor carriage, and thus an estimated length of conveyor belt in a belt storage unit (i.e., take-up unit). However, the use of incremental end coders is inaccurate and must be reset every time a power outage occurs.

SUMMARY

In one embodiment, the invention provides a conveyor system including a conveyor belt, a conveyor rail, a conveyor carriage, a winch, a position sensor, and a controller. The conveyor rail includes a track, the track having a proximal end and a distal end, and a conveyor take-up for collecting excess conveyor belt. The conveyor carriage is configured to move along the track between the proximal end and the distal end. The conveyor carriage includes a base, the base rotatably supporting the conveyor belt, and a target. The winch is positioned proximate the end of the track. The winch includes a carriage cable coupling the conveyor carriage to the winch, a motor, and a motor sensor configured to sense a motor characteristic. The position sensor is configured to sense a position of the target. The controller includes a memory and a processor and is configured to receive the motor characteristic and the position of the target, calculate a characteristic of the conveyor system, and output the characteristic.

In another embodiment the invention provides a method of monitoring a conveyor system including a conveyor belt, a conveyor rail having a proximal end and a distal end, a conveyor carriage configured to move along the conveyor rail between the proximal end and the distal end, a winch having a motor, and a position sensor. The method including receiving a position of the conveyor carriage on the conveyor rail; receiving a rotational speed and a rotational direction of the motor; calculate a characteristic of the conveyor system, the characteristic based on the position of the conveyor carriage, the rotational speed of the motor, and the rotational direction of the motor; and output the characteristic of the conveyor system.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

Figure 1:
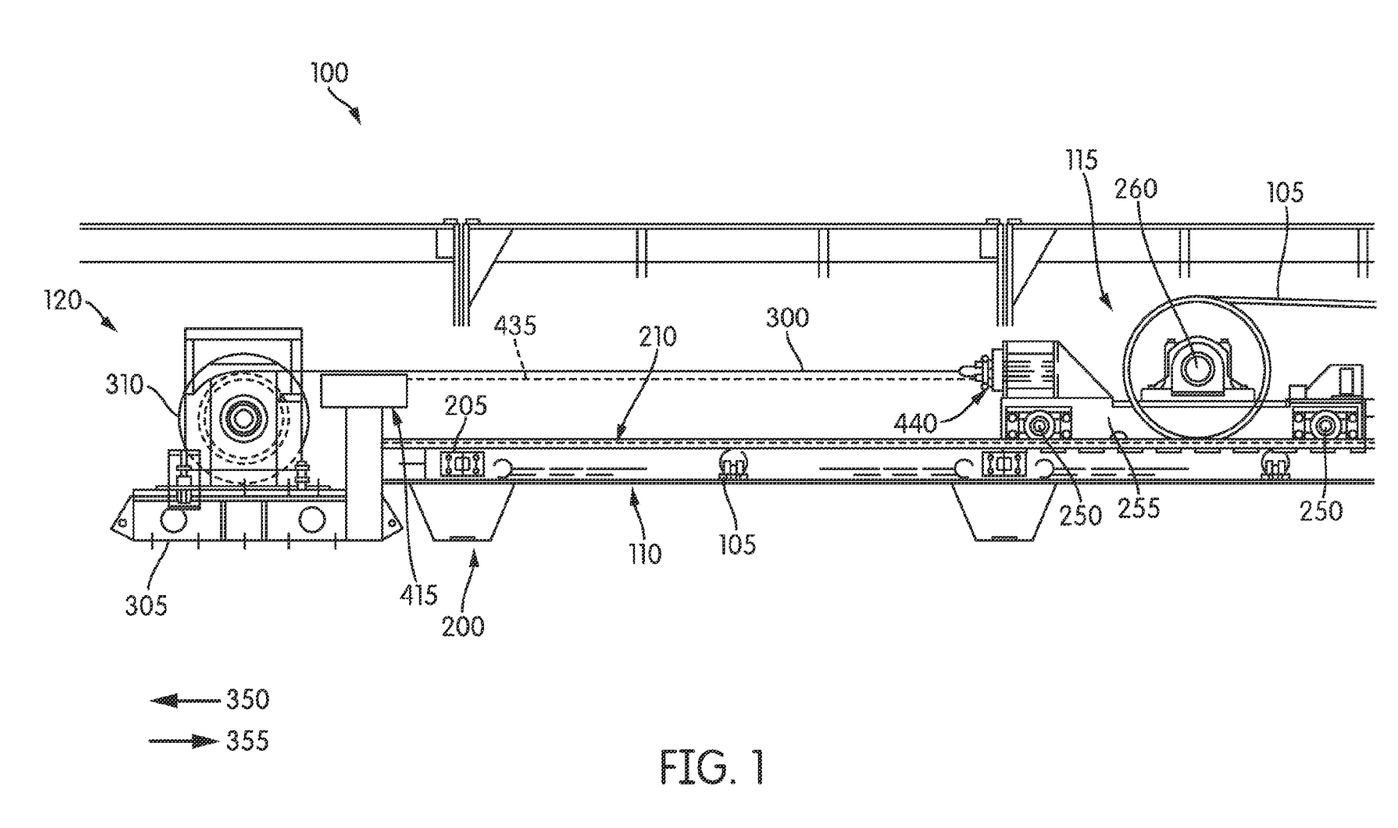
FIG. 1 illustrates a side view of a conveyor system.
Figure 2:
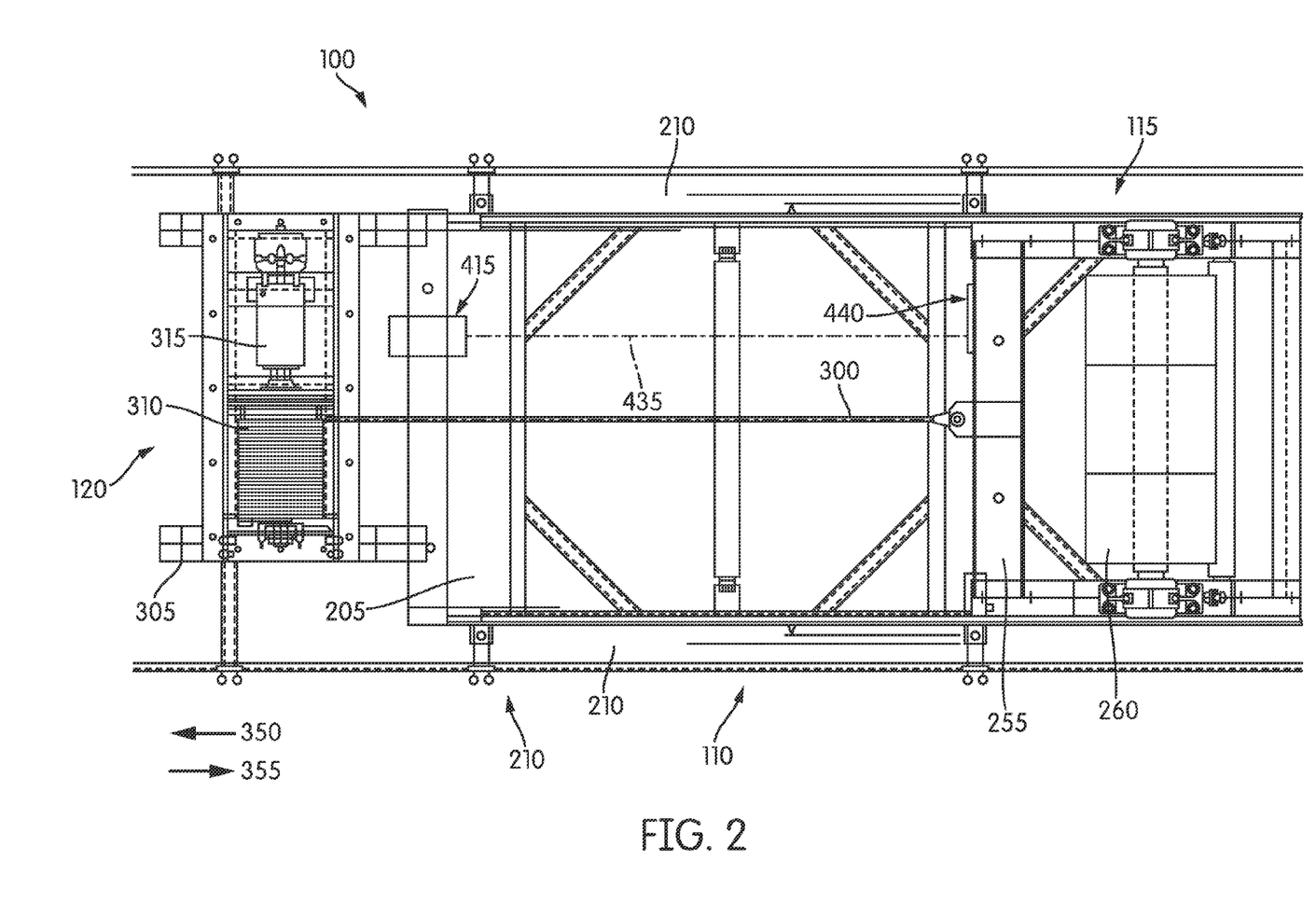
FIG. 2 illustrates a top view of the conveyor system of FIG. 1.

FIGS. 1 and 2 illustrate a conveyor system 100. In one embodiment, the conveyor system 100 is used in underground mining operations. In some embodiments, the conveyor system 100 is used in conjunction with longwall mining. The conveyor system 100 transports mined material (e.g., coal, ore, rock, etc.), via a conveyor belt 105, through a mine. During transportation of the mined material, the conveyor belt 105 must maintain a constant proper tension.

The conveyor system 100 includes a conveyor rail system 110, a conveyor carriage system 115, and a winch system 120. The conveyor rail system 110, the conveyor carriage system 115, and the winch system 120 help maintain the conveyor belt 105 at a proper tension.

The conveyor rail system 110 extends along a wall of the mine. The conveyor rail system 110 includes a proximal end

200, a distal end (not shown), a conveyor take-up 205, and rail tracks 210. The conveyor take-up 205 collects excess conveyor belt 105. The conveyor take-up 205 further allows excess conveyor belt 105 out. In some embodiments, the conveyor take-up 205 includes a plurality of take-up pulleys. In such an embodiment, the conveyor belt 105 is lapped around the plurality of take-up pulleys. In the illustrated embodiment, the conveyor take-up 205 is a horizontal take-up. In another embodiment, the conveyor take-up 205 is a gravity take-up. In yet another embodiment, the conveyor take-up 205 is a vertical take-up. The rail tracks 210 provide a track for the conveyor carriage system 115.

In one embodiment, the conveyor carriage system 115 includes carriage wheels 250, a carriage base 255, and a drive sprocket 260. The carriage wheels 250 support the carriage base 255, and are operable to allow movement of the conveyor carriage system 115 along the rail tracks 210. The drive sprocket 260 is connected to the carriage base 255. The drive sprocket 260 is coupled to a drive sprocket motor (not shown). The drive sprocket motor rotates the drive sprocket 260. As the drive sprocket 260 is rotated, the conveyor belt 105 is driven in a desired direction for transporting the mined material.

In another embodiment, rather than the drive sprocket 260, the conveyor carriage system 115 includes an idler, or idle pulley. In such an embodiment, the idler in is contact with the conveyor belt 105. The idler freely rotates as the conveyor belt 105 is driven.

The winch system 120 is located adjacent to the proximal end 200 of the conveyor rail system 110. The winch system 120 maintains a constant connection with the carriage base 205 via a carriage cable 300. The winch system 120 includes a winch base 305, a winch 310, and a winch motor 315. The winch base 305 supports the winch 310 and winch motor 315. The carriage cable 300 is let-out or wound-up, by the winch 310.

During operation, the winch 310 winds-up the carriage cable 300. As the carriage cable 300 is wound-up, the conveyor carriage system 115 moves in a first direction 350, toward the winch system 120. As the conveyor carriage system 115 moves in the first direction 350, excess conveyor belt 105 is stored in the conveyor belt take-up 205, resulting in greater tension of the conveyor belt 105.

When less tension of the conveyor belt 105 is needed, the winch 310 lets-out the carriage cable 300. As the carriage cable 300 is let-out, the conveyor carriage system 115 is allowed to move in a second direction 355, away from the winch system 120. As the conveyor carriage system 115 moves in the second direction 355, conveyor belt 105 is let out of the conveyor belt take-up 205.

Figure 3:
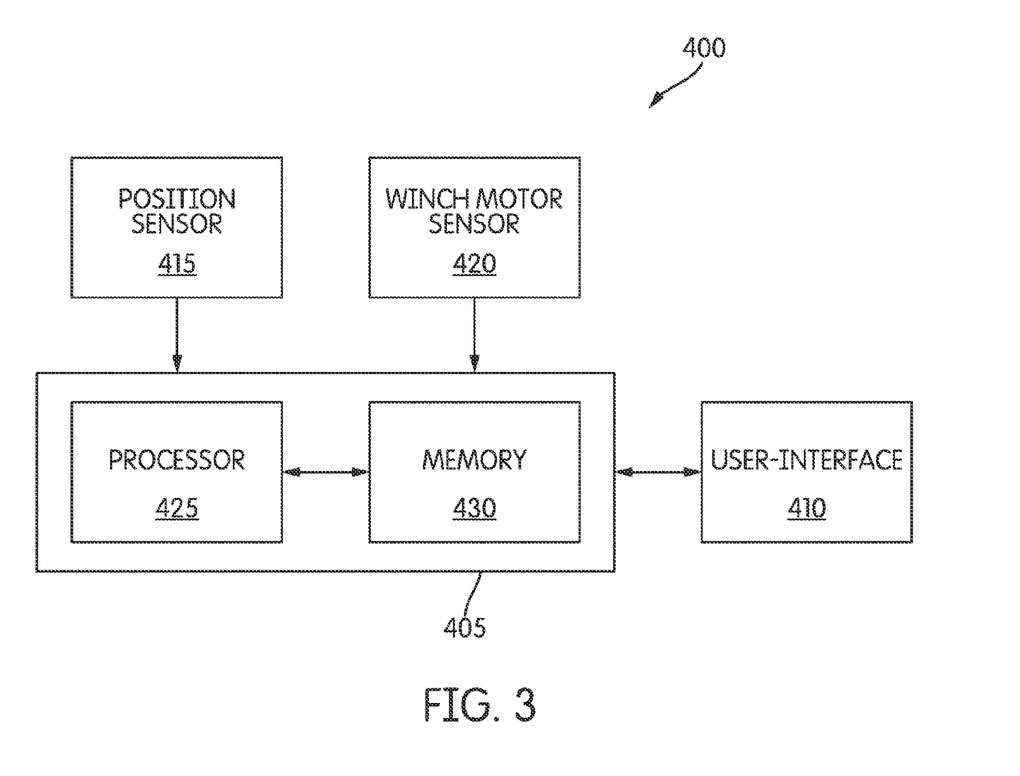
FIG. 3 illustrates a control system of the conveyor system shown in FIGS. 1 and 2.

FIG. 3 illustrates a monitoring system 400 for monitoring various aspects of the mining system 100. The monitoring system 400 includes a controller 405, a user-interface 410, a position sensor 415, and a winch motor sensor 420. In other embodiments, the monitoring system 400 includes more or less components. The controller 405 includes a processor 425 and a memory 430. The memory 430 stores instructions executable by the processor 425 and various inputs/outputs for, e.g., allowing communication between the controller 405 and the operator or between the controller 405 and the various sensors. In some instances, the controller 405 includes one or more of a microprocessor, digital signal processor (DSP), field programmable gate array (FPGA), application specific integrated circuit (ASIC), or the like.

The user-interface 410, such as an operator user-interface, provides information to the operator (e.g., the status of the mining system 100, characteristics of the mining system 100, etc.). The user-interface 410 includes one or more of the following: a display (e.g., a liquid crystal display (LCD)); one or more light emitting diodes (LEDs) or other illumination devices; a heads-up display; speakers for audible feedback (e.g., beeps, spoken messages, etc.); tactile feedback devices such as vibration devices; or another feedback device.

The controller 405 is in communication with the position sensor 415. In some embodiments, the position sensor 415 is an ultrasonic sensor, such as but not limited to, a DME4000 Distance Measuring Sensor by Rockwell Collins. The position sensor 415 continually senses a distance between the conveyor carriage system 115 and the winch system 120. In some embodiments, the position sensor 415 is located on the winch base 305 of the winch system 120. The position sensor 415 acts as both an output and an input for a signal 435 (FIGS. 1 and 2). In some embodiments, the signal 435 is an ultrasonic signal (e.g., a laser signal). The signal 435 is reflected off of a target 440 located on the conveyor carriage system 115 (e.g., the conveyor base 225). In some embodiments, the target 440 is a minimum of six inches by six inches. The travel time of the signal 435 reflected off of the target 440 is used to determine a distance between the position sensor 415 and the target 440. This distance between the position sensor 415 and the target 440 is directly related to the distance between the winch system 120 and the conveyor carriage system 115.

In operation, the position sensor 415 outputs the signal 435 towards the target 440. The signal 435 is reflected off of the target 440 back towards the position sensor 415. The position sensor 415 receives the reflected signal 435. The position sensor 415 calculates the travel time of the signal 435 travelling to the target 440, reflecting off the target 440, and travelling back to the position sensor 415. The position sensor 415 calculates the distance (i.e., position of the target 440) by using the relationship with time: Distance=½ (Speed×Time), where speed is equal to the speed of light (i.e., 300,000 km/s). The position sensor 415 sends the calculated distance (i.e., position) to the controller 405.

The controller 405 determines the travelling speed (i.e., velocity) of the conveyor carriage system 115, and the direction of the movement, as the conveyor carriage system 115 moves toward or away from the winch system 120. The controller 405 determines the travelling speed from two or more calculated distances received from the position sensor 415, along with difference in time between the calculated distances. The travelling speed is calculated using the following equation: Speed=(Distance$_2$−Distance$_1$)/(Time$_2$−Time$_1$).

The controller 405 is in further communication with the winch motor sensor 420. The winch motor sensor 420 monitors characteristics of the winch motor 315, such as but not limited to, the rotational speed of the winch motor 315 and the rotational direction of the winch motor 315. In some embodiments the winch motor sensor 420 is a magnetic sensor (e.g., a hall effect sensor). In other embodiments, the winch motor sensor 420 is a current sensor, an optical sensor, or another type of motor sensor. The winch motor sensor 420 outputs the sensed rotational speed and the sensed rotational direction of the winch motor 315 to the controller 405.

In operation, the controller 405 calculates characteristics of the mining system 100 based on the position of the target 440 and/or the characteristics of the winch motor 315. The characteristics of the mining system 100 may include, but are not limited to, operational and mechanical issues of the conveyor system 100. For example, but not limited to, the controller 405 is operable to detect if the conveyor belt 105 breaks, detect if the carriage cable 300 breaks, and monitor if there are control problems over the mining system 100.

Figure 4:
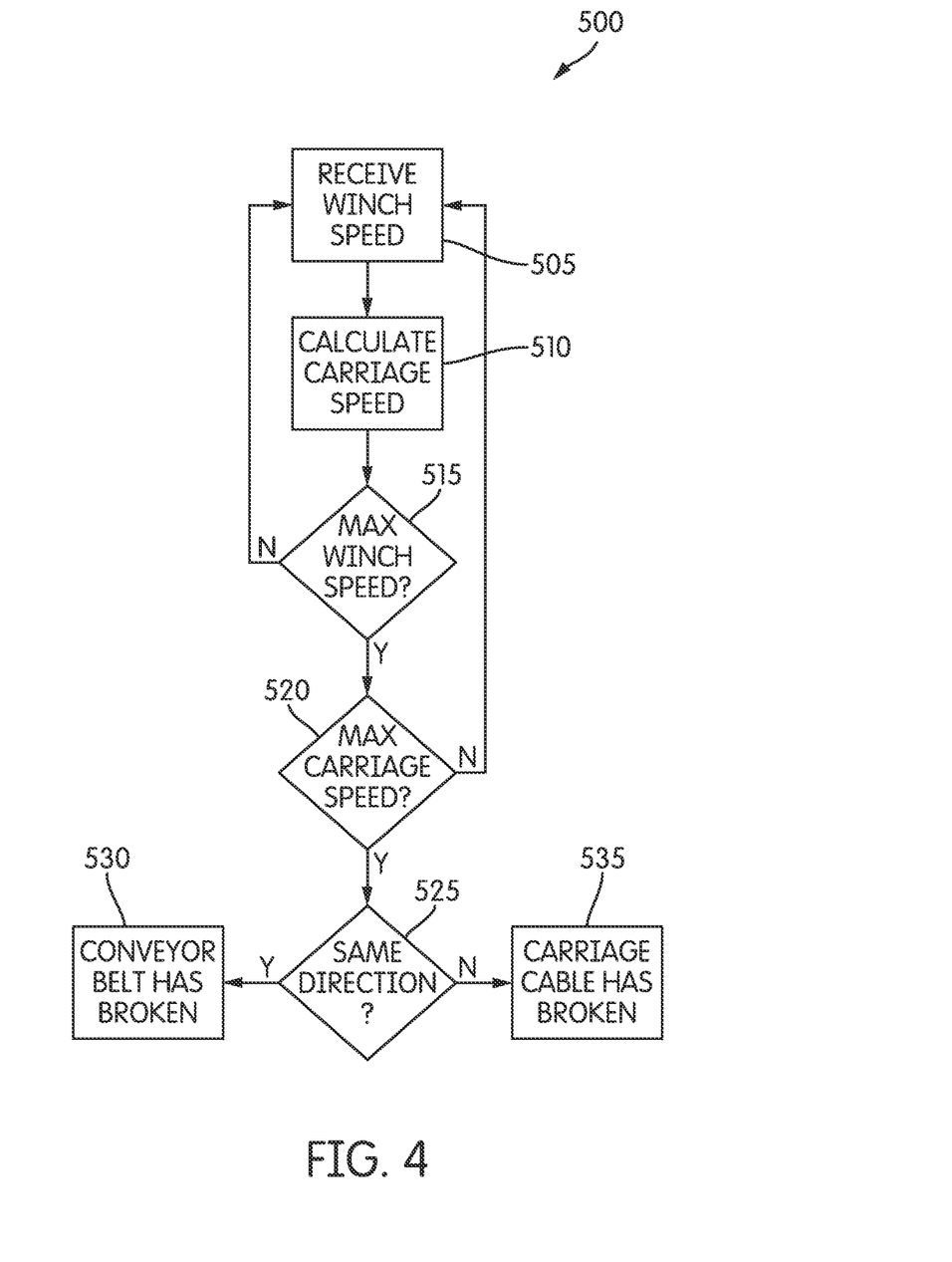
FIG. 4 is a flowchart illustrating operation of the conveyor system shown in FIGS. 1 and 2.

FIG. 4 illustrates an operation 500 for determining a mechanical issue of the conveyor system 100. The controller 405 receives the rotational speed of the winch motor 315 from the winch motor sensor 420 (Step 505). The controller 405 calculates the travelling speed of the conveyor carriage system 115 from the received positions of the conveyor carriage system 115 (Step 510). The controller 405 determines if the rotational speed has reached a predefined maximum rotational speed (Step 515). If the rotational speed has not reached the predefined maximum rotational speed, the operation continues to Step 505. If the rotational speed has reached the predefined maximum rotational speed, the controller 405 determines if the travelling speed has reached a predefined maximum travelling speed (Step 520). If the travelling speed has not reached the predefined maximum travelling speed, the operation continues to Step 505. If the travelling speed has reached the predefined maximum travelling speed, the controller 405 determines if the rotation of the winch motor 315 and the travelling direction of the conveyor system 110 are in the same direction (Step 525). If the movement of the winch motor 315 and the movement of the conveyor carriage system 115 are in the same direction, the controller 405 determines that the conveyor belt 105 has broken (Step 530). If the movement of the winch motor 315 and the movement of the conveyor carriage system 115 are not in the same direction, the controller 405 determines that the carriage cable 300 has broken (Step 535).

In one embodiment, if the controller 405 determines that there has been an operational or mechanical issue with the conveyor system 100 or abnormal operation of the conveyor system 100, the controller 405 shuts down the conveyor system 100. In another embodiment, if the controller 405 determines that there has been an operational or mechanical issue with the conveyor system 100, the controller 405 outputs an alert to an operator via the user-interface 410. An operational or mechanical issue may include, but is not limited to, a broken conveyor belt 105, a broken carriage cable 300, a misalignment of the position sensor 415, a misalignment of the target 440, an over-speed condition of the winch 310 (e.g., during pay-in operations or pay-out operations), encoder speed errors, and abnormal operation of the conveyor system 100 (e.g., abnormal operation of the winch 310, unstable conveyor belt 105, etc.). In some embodiments the controller 405 determines if there has been abnormal operation of the conveyor system 100 by comparing real-time velocity values of the winch motor 315 and/or the conveyor carriage system 115 with standard velocity models. Variations between the real-time velocities and the standard velocity models may indicate an abnormal operation of the conveyor system 100. For example, if a conveyor belt 105 is unstable, the conveyor belt 105 produces oscillations. These oscillations can be detected by the controller 405 by analyzing variations between the real-time velocities and the standard velocity models.

Figure 5:
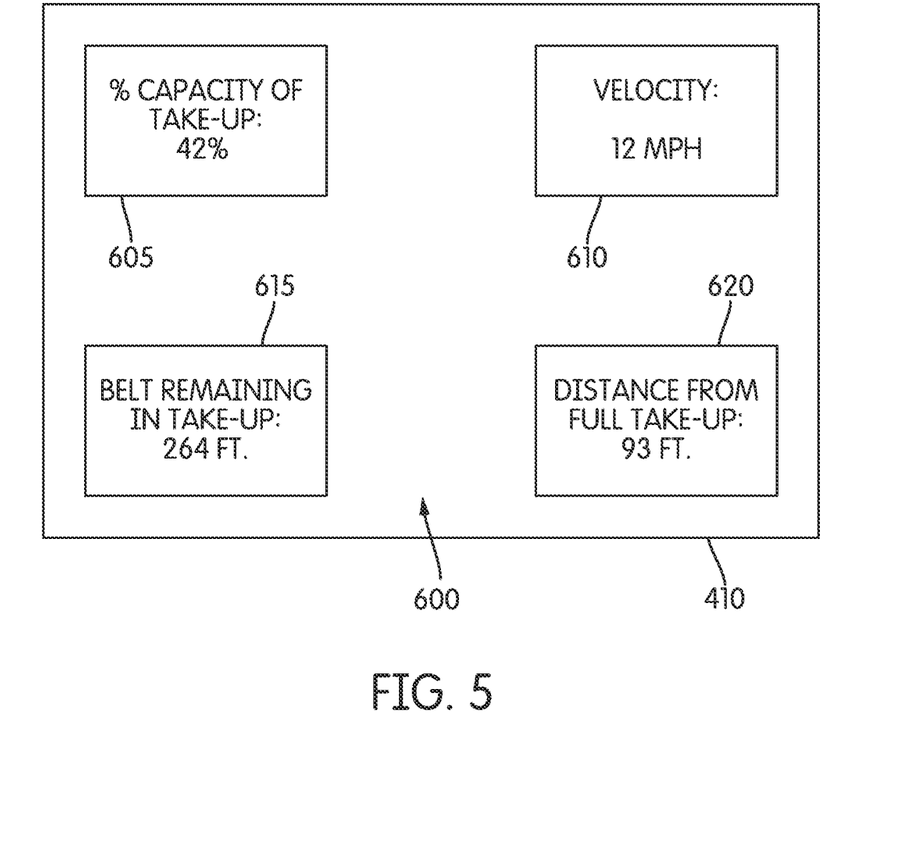
FIG. 5 illustrates a user-interface of the conveyor system of FIG. 1.

FIG. 5 illustrates an embodiment of user-interface 410. In the illustrated embodiment, the controller 405 outputs a plurality of characteristics 600 of the conveyor system 100. The plurality of characteristics 600 may include, but are not limited to, a capacity of take-up 605, a velocity 610 of the conveyor carriage system 115, an amount 615 of the conveyor belt 105 remaining in the conveyor take-up 205, and a distance 620 that the conveyor carriage system 115 will travel before the conveyor take-up 205 is full.

In another embodiment, the controller 405 is further in communication (e.g., wired communication or wireless communication) with a network. In such an embodiment, the controller 405 outputs the characteristics of the mining system 100 to the network for further analysis.

Thus, the invention provides, among other things, position monitoring for conveyor belts used in the mining industry. Although the invention has been described in detail with reference to certain preferred embodiments, variations and modifications exist within the scope and spirit of one or more independent aspects of the invention as described.

What is claimed is:

1. A conveyor system comprising:
   a conveyor belt;
   a conveyor rail including
      a track having a proximal end and a distal end, and
      a conveyor take-up for collecting excess conveyor belt;
   a conveyor carriage configured to move along the track between the proximal end and the distal end, the conveyor carriage including
      a base rotatably supporting the conveyor belt, and
      a target;
   a winch positioned proximate the proximal end of the track, the winch including
      a carriage cable coupling the conveyor carriage to the winch,
      a motor, and
      a motor sensor configured to sense a motor characteristic;
   a position sensor configured to sense a position of the target; and
   a controller having a memory and a processor, the controller configured to
      receive the motor characteristic and the position of the target,
      calculate a characteristic of the conveyor system, and
      output the characteristic.

2. The conveyor system of claim 1, wherein the motor sensor is one of a magnetic sensor, a current sensor, and an optical sensor.

3. The conveyor system of claim 1, wherein the position sensor is an ultrasonic sensor.

4. The conveyor system of claim 1, wherein the motor characteristic includes one of a rotational speed and a rotational direction.

5. The conveyor system of claim 1, wherein the position is a distance between the target and the position sensor.

6. The conveyor system of claim 1, wherein the characteristic is output to one of a user-interface and a network.

7. The conveyor system of claim 1, wherein the characteristic is a capacity of the conveyor take-up.

8. The conveyor system of claim 1, wherein the characteristic is a velocity of the conveyor carriage.

9. The conveyor system of claim 1, wherein the characteristic is a length of the conveyor belt in the conveyor take-up.

10. The conveyor system of claim 1, wherein the characteristic is a distance the conveyor carriage will travel before the conveyor take-up is full.

11. The conveyor system of claim 1, wherein the controller further determines if the conveyor belt is broken based on a rotational direction of the motor and a direction of movement of the conveyor carriage being equal.

12. The conveyor system of claim 1, wherein the controller further determines if the carriage cable is broken based on a rotational direction of the motor and a direction of movement of the conveyor carriage being opposite.

13. The conveyor system of claim 1, wherein the controller is further configured to determine if an issue is present and shut down the conveyor system if an issue is present.

14. A method of monitoring a conveyor system including a conveyor belt, a conveyor rail having a proximal end and a distal end, a conveyor carriage configured to move along the conveyor rail between the proximal end and the distal end, a winch having a motor, and a position sensor, the method comprising:
   receiving a position of the conveyor carriage on the conveyor rail;
   receiving a rotational speed and a rotational direction of the motor;
   calculate a characteristic of the conveyor system, the characteristic based on
      the position of the conveyor carriage,
      the rotational speed of the motor, and
      the rotational direction of the motor; and
   output the characteristic of the conveyor system.

15. The method of claim 14, wherein characteristic is a capacity of the conveyor take-up.

16. The method of claim 14, wherein the characteristic is a velocity of the conveyor carriage.

17. The method of claim 14, wherein the characteristic is a length of the conveyor belt in the conveyor take-up.

18. The method of claim 14, wherein the characteristic is a distance the conveyor carriage will travel before the conveyor take-up is full.

19. The method of claim 14, further comprising determining if the conveyor belt is broken based on the rotational direction of the motor and a direction of movement of the conveyor carriage being equal.

20. The method of claim 14, further comprising determining if the carriage cable is broken based on the rotational direction of the motor and a direction of movement of the conveyor carriage being opposite.

* * * * *